United States Patent
Stölzer et al.

[11] 3,897,520
[45] July 29, 1975

[54] O-ALKYL-N-MONO-ALKYL-S-(AMIDOCARBONYL)-METHYL-MONOTHIOPHOSPHORIC ACID ESTER AMIDES

[75] Inventors: Claus Stölzer, Wuppertal; Ingeborg Hammann, Cologne; Günter Unterstenhöfer, Opladen, all of Germany

[73] Assignee: Bayer Aktiengesellschaft, Leverkusen, Germany

[22] Filed: June 13, 1973

[21] Appl. No.: 369,688

[30] Foreign Application Priority Data
June 27, 1972 Germany............................ 2231412

[52] U.S. Cl.................................. 260/943; 424/211
[51] Int. Cl............................ C07f 9/24; A01n 9/36
[58] Field of Search.................................... 260/943

[56] References Cited
UNITED STATES PATENTS
3,019,250  1/1962  Kayser et al................... 260/943 X Primary Examiner—Anton H. Sutto
Attorney, Agent, or Firm—Burgess, Dinklage & Sprung

[57] ABSTRACT

O-alkyl-N-mono-alkyl-S-(amidocarbonyl)-methyl-monothiophosphoric acid ester amides of the formula

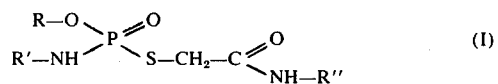

in which R, R' and R'' each independently is alkyl of 1 to 6 carbon atoms, which possess insecticidal, acaricidal and nematocidal properties.

6 Claims, No Drawings

O-ALKYL-N-MONO-ALKYL-S-(AMIDOCARBONYL)-METHYL-MONOTHIO-PHOSPHORIC ACID ESTER AMIDES

The present invention relates to and has for its objects the provision of particular new O-alkyl-N-mono-alkyl-S-(amidocarbonyl)-methyl-monothiophosphoric acid ester amides which possess insecticidal, acaricidal and nematocidal properties, active compositions in the form of mixtures of such compounds with solid and liquid dispersible carrier vehicles, and methods for producing such compounds and for using such compounds in a new way especially for combating pests, e.g. insects, acarids and nematodes, especially insects and acarids, with other and further objects becoming apparent from a study of the within specification and accompanying examples.

It has been disclosed in German Published Specifications DAS 1,135,905 and U.S. Pat. No. 3,019,250 that salts of O-alkyl-N-monoalkyl-amido-monothiophosphoric acids can be alkylated with substituted halogenomethyl compounds and that the products obtained in this way are distinguished by insecticidal and acaricidal activity.

The present invention provides, as new compounds, the S-(amidocarbonyl)-methyl-monothiophosphoric acid ester amides of the general formula

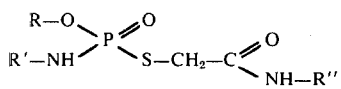  (I)

in which R, R' and R'' each independently is alkyl of 1 to 6 carbon atoms.

Preferably R, R' and R'' are each a straight-chain or branched lower alkyl radical with 1 to 4 carbon atoms, namely methyl, ethyl, iso- or n-propyl or n-, iso-, sec.- or tert.-butyl.

Surprisingly, the S-(amidocarbonyl)-methyl-monothiophosphoric acid ester amides of the formula (I) possess a substantially better insecticidal and acaricidal action than the prior-art S-(amidocarbonyl)-methyl-monothio- and -dithiophosphoric acid O,O-dialkyl esters, which are the nearest comparable compounds as regards structure and type of action and also the best-known commercially available products of this class of compounds. They also exhibit nematocidal activity. The compounds according to the invention thus represent an enrichment of the art.

The present invention also provides a process for the production of an S-(amidocarbonyl)-methyl-monothiophosphoric acid ester amide of the formula (I) in which an O-alkyl-N-monoalkylamido-monothiophosphate salt of the general formula

  (II)

is reacted with a halogenoacetic acid monoalkylamide of the general formula

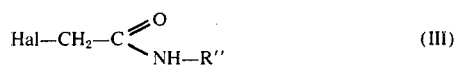  (III)

in which formulas,
R, R' and R'' have the above-mentioned meanings,
Hal is halogen, preferably bromine or chlorine, and
M is an alkali metal, alkaline earth metal or optionally alkyl-substituted ammonium equivalent.

If the sodium salt of O-ethyl-N-monoisopropylamido-monothiophosphoric acid and chloroacetic acid monomethylamide are used as the starting materials, the course of the reaction can be represented by the following equation:

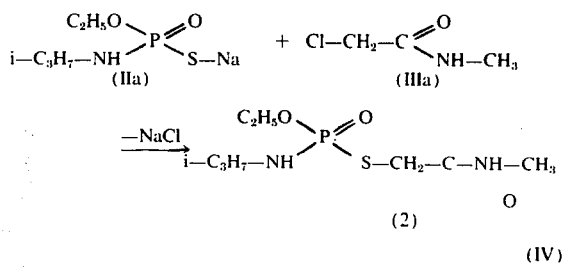

The following may be mentioned as examples of the O-alkyl-N-monoalkylamido-monothiophosphate salts (II) which can be used in the preparative process: the alkali metal, alkaline earth metal and optionally alkyl-substituted ammonium salts of O-methyl-N-methyl-(or N-propyl- or N-isopropyl-), O-ethyl-N-methyl-(or N-ethyl- or N-isopropyl-) and O-butyl-N-ethyl-amido-monothiophosphoric acids.

These salts, as well as the halogenoacetic acid derivatives (III), as known and are obtainable according to customary methods.

The preparative process for the new compounds is preferably carried out with the use of a suitable solvent or diluent. Practically all inert organic solvents can be used for this purpose, especially aliphatic and aromatic, optionally chlorinated, hydrocarbons, such as benzene, toluene, xylene, benzine, methylene chloride, chloroform, carbon tetrachloride and chlorobenzene; ethers, for example diethyl ether, dibutyl ether and dioxane; ketones, for example acetone, methyl ethyl ketone, methyl isopropyl ketone and methyl isobutyl ketone; nitriles, such as acetonitrile and propionitrile; and alcohols, for example methanol, ethanol and isopropanol. In certain cases, water is also suitable as a solvent.

The reaction temperature can be varied over a fairly wide range. In general, the reaction is carried out at 0° to 120°, preferably at from 15° to 60°C.

In general, the reaction is carried out under normal pressure.

To carry out the process, the starting compounds are in most cases employed in equimolar ratios. An excess of one or other reactant produces no significant advantages. The reaction is preferably carried out in the presence of one of the above-mentioned solvents, at the indicated temperatures, and after stirring for several hours the reaction mixture is worked up in the customary manner.

The compounds according to the invention are in most cases obtained in the form of colorless or slightly colored, viscous, water-soluble oils or as crystals, which generally can not be distilled without decomposition but can be freed of the last volatile constituents by so-called "slight distillation", that is to say prolonged heating under reduced pressure to moderately elevated temperatures, and can in this way be purified. They are characterized, in particular, by the refractive index and, in the case of solid compounds, by the melting point.

As has already been mentioned, the new S-(amidocarbonyl)-methyl-monothiophosphoric acid ester amides are distinguished by an excellent insecticidal and acaricidal activity towards plant pests and pests harmful to health. In this respect, they possess a good action against both sucking insects and biting insects and against mites (*Acarina*). At the same time they display an action against soil insects and nematodes, and only a low phytotoxicity. For these reasons, the compounds according to the invention may be successfully employed as pesticides in plant protection and in the hygiene field.

To the sucking insects there belong, in the main, aphids (*Aphididae*) such as the green peach aphid (*Myzus persicae*), the bean aphid (*Doralis fabae*), the bird cherry aphid (*Rhopalosiphum padi*), the pea aphid (*Macrosiphum pisi*) and the potato aphid (*Macrosiphum solanifolii*), the currant gall aphid (*Cryptomyzus korschelti*), the rosy apple aphid (*Sappaphis mali*), the mealy plum aphid (*Hyalopterus arundinis*) and the cherry black-fly (Myzus cerasi); in addition, scales and mealybugs (*Coccina*), for example the oleander scale (*Aspidiotus hederae*), the soft scale (*Lecanium hesperidum*) and the grape mealybug (*Pseudococcus maritimus*); thrips (*Thysanoptera*), such as hercinothrips femoralis, and bugs, for example the beet bug (*Piesma quadrata*), the red cotton bug (*Dysdercus intermedius*), the bed bug (*Cimex lectularius*), the assassin bug (*Rhodnius prolixus*) and Chagas' bug (*Triatoma infestans*) and cicadas, such as *Euscelis bilobatus* and *Nephotettix bipunctatus*.

In the case of the biting insects, above all there should be mentioned butterfly caterpillars (*Lepidoptera*) such as the diamond-back moth (*Plutella maculipennis*), the gypsy moth (*Lymantria dispar*), the browntail moth (*Euproctis chrysorrhoea*) and tent caterpillar (*Malacosoma neustria*); further, the cabbage moth (*Mamestra brassicae*) and the cutworm (*Agrotis segetun*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia kühniella*) and greater wax moth (*Galleria mellonella*).

Also to be classed with the biting insects are beetles (*Coleoptera*), for example the granary weevil (*Sitophilus granarius = Calandra granaria*), the Colorado bettle (*Leptinotarsa decemlineata*), the dock beetle (*Gastrophysa viridula*), the mustard beetle (*Phaedon cochlearia*), the blossom beetle (*Meligethes aeneus*), the raspberry beetle (*Byturus tomentosus*), the bean weevil (*Bruchidius = Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*), and the saw-toothed grain beetle (*Oryzaephilus surinamensis*), but also species living in the soil, for example wireworms (*Agriotes* spec.) and larvae of the cockchafer (*Melolontha melolontha*); cockroaches, such as the German cockroach (*Blattella germanica*), American cockroach (*Periplaneta americana*), Madeira cockroach (*Leucophaea* or *Rhyparobia maderae*), oriental cockroach (*Blatta orientalis*), the giant cockroach (*Blaberus giganteus*) and the black giant cockroach (*Blaberus fuscus*) as well as *Henschoutedenia flexivitta*; further, *Orthoptera*, for example the house cricket (*Acheta domesticus*); termites such as the eastern subterranean termite (*Reticulitermes flavipes*) and *Hymenoptera* such as ants, for example the garden ant (*Lasius niger*).

The *Diptera* comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia regina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*).

With the mites (*Acarina*) there are classed, in particular, the spider mites (*Tetranychidae*) such as the two-spotted spider mite (*Tetranychus urticae*) and the European red mite (*Paratetranychus pilosus = Panonychus ulmi*), gall mites, for example the black currant gall mite (*Eriophyes ribis*) and tarsonemids, for example the broad mite (*Hemitarsonemus latus*) and the cyclamen mite (*Tarsonemus pallidus*); finally ticks, such as the relapsing fever tick (*Ornithodorus moubata*).

When applied against pests harmful to health and pests of stored products, particularly flies and mosquitoes, the compounds of this invention are also distinguished by an outstanding residual activity on wood and clay as well as a good stability to alkali on limed substrates.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cycloalkanes (e.g. cyclohexane, etc.), paraffins (e.g. petroleum or mineral oil fractions), chlorinated aliphatic hydrocarbons (e.g. methylene chloride, chloroethylenes, etc.), alcohols (e.g. methanol, ethanol, propanol, butanol, glycol, etc.) as well as ethers and esters thereof (e.g. glycol monomethyl ether, etc.), amines (e.g. ethanolamine, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alimina, silica, chalk, i.e. calcium carbonate, talc, attapulgite, montmorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and-/or anionic emulsifying agents (e.g. polyethylene oxide esters of fatty acids, polyethylene oxide ethers of fatty alcohols, alkyl sulfates, alkyl sulfonates, aryl sulfonates, albumin hydrolyzates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other insecticides, acaricides and nematodes, or rodenticides, fungicides, bactericides, herbicides, fertilizers, growth-regulating agents, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95 percent by weight, and preferably 0.5 –90 percent by weight, of the mixture, whereas carrier composition mixtures suitable for direct application or field application generally contemplate those in which the active compound is present in an amount substantially between about 0.0001–10 percent, preferably 0.01–1%, by weight of the mixture. Thus, the present invention contemplates over-all compositions which comprises mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and-/or a dispersing agent, and an amount of the active compound which is effective for the purpose in question and which is generally between about 0.0001–95 percent, and preferably 0.01–95 percent, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 15 to 1000 g/hectare, preferably 40 to 600 g/hectare, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combating or controlling pests, e.g. insects, acarids and nematodes, and more particularly methods of combating at least one of insects and acarids, which comprises applying to at least one of correspondingly (a) such insects, (b) such acarids, (c) such nematodes, and (d) the corresponding habitat thereof, i.e. the locus to be protected, a correspondingly combative or toxic amount, i.e. an insecticidally, acaricidally or nematocidally effective amount, of the particular active compound of the invention alone or together with a carrier vehicle as noted above. The instant formulations or compositions are applied in the usual manner, for instance by spraying, atomizing, varporizing, scattering, dusting, watering, squirting, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The synthesis, unexpected superiority and outstanding activity of the particular new compounds of the present invention are illustrated, without limitation, by the following examples:

EXAMPLE 1

Phaedon Test (systemic long-term action)

Solvent: 3 parts by weight of acetone
Emulsifier: 1 part by weight of alkylaryl polyglycol ether.

To prepare a suitable preparation of active compound, 1 part by weight of active compound was mixed with the indicated amount of solvent which contained the indicated amount of emulsifier and the concentrate was diluted with water to the desired concentration of 0.025 percent by weight of active compound.

Cabbage plants (*Brassica oleracea*) were each watered with 50 ml of the preparation of active compound so that the preparation of active compound penetrated into the soil without wetting the leaves of the cabbage plants. The active compound was taken up by the cabbage plants from the soil and thus passed to the leaves. 12.5 mg of active compound were used per 100 g of soil (weighed air-dry).

After the indicated times, the plants were infested with mustard beetles (*Phaedon cochleariae*) and their destruction was determined after intervals of 3 days. Here, 100 percent denotes that all larvae were destroyed and 0 percent denotes that no larvae were destroyed.

The active compound, the concentrations of the active compounds, the evaluation times and the results can be seen from the following Table 1:

Table 1

(Long term action after watering: *Phaedon cochleariae* larvae / *Brassica oleracea*)

| Active compound | | mg of active compound per 100 g of soil, (weighed air-dry) | % destruction after days: | | | | | | | |
|---|---|---|---|---|---|---|---|---|---|---|
| | | | 6 | 10 | 17 | 20 | 27 | 31 | 34 | 38 |
| $CH_3O$\P(=O)−S−CH$_2$−C(=O)−NH−CH$_3$ / $CH_3O$ (known) | (A) | 12.5 | 100 | 100 | 80 | 30 | | | | |
| $C_2H_5O$\P(=O)−S−CH$_2$−C(=O)−NH−CH$_3$ / $CH_3$−NH | (4) | 12.5 | 100 | 100 | 100 | 100 | — | 100 | 60 | 50 |
| $C_2H_5O$\P(=O)−S−CH$_2$−C(=O)−NH−i−C$_3$H$_7$ / $CH_3$−NH | (3) | 12.5 | 100 | 100 | 100 | 100 | 100 | 100 | 80 | 50 |
| $C_2H_5O$\P(=O)−S−CH$_2$−C(=O)−NH−CH$_3$ / i−C$_3$H$_7$−NH | (2) | 12.5 | 100 | 100 | 100 | 100 | — | 100 | 80 | 20 |
| $C_2H_5O$\P(=O)−S−CH$_2$−C(=O)−NH−i−C$_3$H$_7$ / i−C$_3$H$_7$−NH | (1) | 12.5 | 100 | 100 | 100 | 100 | 100 | 100 | 50 | 20 |

EXAMPLE 2

Myzus Test (systemic long-term action)

Solvent: 3 parts by weight of acetone
Emulsifier: 1 part by weight of alkylaryl polyglycol ether To prepare a suitable preparation of active compound, 1 part by weight of active compound was mixed with the indicated amount of solvent which contained the indicated amount of emulsifier and the concentrate was diluted with water to the desired concentration of 0.025 percent by weight of active compound.

Cabbage plants (*Brassica oleracea*) were each watered with 50 ml of the preparation of active compound so that the preparation of active compound penetrated into the soil without wetting the leaves of the cabbage plants. The active compound was taken up by the cabbage plants from the soil and thus passed to the leaves. 12.5 mg of active compound were used per 100 g of soil (weighed air-dry).

After the indicated times, the plants were infested with aphids (*Myzus persicae*) and their destruction was determined after intervals of 3 days. Here, 100 percent denotes that all larvae were destroyed and 0 percent denotes that no larvae had been destroyed.

The active compounds, the concentrations of the active compounds, the evaluation times and the results can be seen from the following Table 2:

Table 2

(Long term action after watering: *Myzus persicae* / *Brassica oleracea*)

| Active compound | | mg of active compound per 100 g of soil (weighed air-dry) | % destruction after days | | | | | | | | |
|---|---|---|---|---|---|---|---|---|---|---|---|
| | | | 17 | 20 | 24 | 31 | 38 | 41 | 45 | 48 | 52 |
| $CH_3O$\P(=O)−S−CH$_2$−C(=O)−NH−CH$_3$ / $CH_3O$ (known) | (A) | 12.5 | 100 | 80 | 0 | | | | | | |
| $CH_3O$\P(=S)−S−CH$_2$−C(=O)−NH−CH$_3$ / $CH_3O$ (known) | (B) | 12.5 | 100 | 100 | 100 | 100 | 75 | 50 | | | |
| $C_2H_5O$\P(=O)−S−CH$_2$−C(=O)−NH−CH$_3$ / $CH_3$−NH | (4) | 12.5 | 100 | 100 | 100 | 100 | 100 | 100 | 100 | 100 | 100 |
| $C_2H_5O$\P(=O)−S−CH$_2$−C(=O)−NH−i−C$_3$H$_7$ / $CH_3$−NH | (3) | 12.5 | 100 | 100 | 100 | 100 | 100 | 100 | 100 | 100 | 100 |
| $C_2H_5O$\P(=O)−S−CH$_2$−C(=O)−NH−CH$_3$ / i−C$_3$H$_7$−NH | (2) | 12.5 | 100 | 100 | 100 | 100 | 100 | 100 | 100 | 100 | 100 |
| $C_2H_5O$\P(=O)−S−CH$_2$−C(=O)−NH−i−C$_3$H$_7$ / i−C$_3$H$_7$−NH | (1) | 12.5 | 100 | 100 | 100 | 100 | 100 | 100 | 100 | 100 | 100 |

EXAMPLE 3

Plutella Test (long-term action after spraying)

Solvent: 3 parts by weight of acetone
Emulsifier: 1 part by weight of alkylaryl polyglycol ether To prepare an appropriate preparation of active compound, 1 part by weight of active compound was mixed with the indicated amount of solvent which contained the indicated amount of emulsifier and the concentrate was diluted with water to the desired concentration.

Cabbage plants (*Brassica oleracea*), which were about 10–15 cm high, were sprayed with the preparation of active compound until dripping wet.

After the indicated times, the plants were infested with caterpillars of the diamond-back moth (*Plutella maculipennis*). After intervals of 3 days, the degree of destruction in percent was determined. Here, 100 percent denotes that all the caterpillars were destroyed; 0 percent denotes that no caterpillars were destroyed.

The active compounds, the concentrations of the active compounds, the evaluation times and the results can be seen from the following Table 3:

Table 3

Long term action after spraying / 0.05% by weight of active compound
(*Plutella maculipennis* on *Brassica oleracea*)

| Active compound | % destruction after days: | | | | | | | | | |
|---|---|---|---|---|---|---|---|---|---|---|
| | 4 | 8 | 11 | 15 | 18 | 22 | 25 | 29 | 32 | 36 |
| $(CH_3O)_2\overset{S}{\overset{\|}{P}}-S-CH_2-\overset{O}{\overset{\|}{C}}-N-H-CH_3$ (B) (known) | 0 | | | | | | | | | |
| $\underset{i-C_3H_7-NH}{\overset{C_2H_5O}{>}}\overset{O}{\overset{\|}{P}}-S-CH_2-\overset{O}{\overset{\|}{C}}-NH-CH_3$ (2) | 100 | 100 | 100 | 80 | 70 | 50 | 85 | 70 | 35 | 10 |

EXAMPLE 4

Myzus Test (Long-term action after spraying)

Solvent: 3 parts by weight of acetone
Emulsifier: 1 part by weight of alkylaryl polyglycol ether To prepare an appropriate preparation of active compound, 1 part by weight of active compound was mixed with the indicated amount of solvent which contained the indicated amount of emulsifier and the concentrate was diluted with water to the desired concentration.

Cabbage plants (*Brassica oleracea*), which weer about 10–15 cm high, were sprayed with the preparation of active compound until dripping wet.

After the indicated times, the plants were infested with aphids (*Myzus persicae*). After intervals of 3 days, the degree of destruction in percent was determined. Here, 100 percent denotes that all the aphids were destroyed; 0 percent denotes that no aphids were destroyed.

The active compounds, the concentrations of the active compounds, the evaluation times and the results can be seen from the following Table 4:

Table 4

Long term action after spraying / 0.05% by weight of active compound
(*Myzus persicae* on *Brassica oleracea*)

| Active compound | % destruction after days: | | | | | | | | | | |
|---|---|---|---|---|---|---|---|---|---|---|---|
| | 4 | 8 | 11 | 15 | 18 | 25 | 29 | 32 | 36 | 39 | 43 |
| $(CH_3O)_2\overset{S}{\overset{\|}{P}}-S-CH_2-\overset{O}{\overset{\|}{C}}-N-H-CH_3$ (B) (known) | 55 | 0 | | | | | | | | | |
| $\underset{CH_3-NH}{\overset{C_2H_5O}{>}}\overset{O}{\overset{\|}{P}}-S-CH_2-\overset{O}{\overset{\|}{C}}-NH-CH_3$ (4) | 100 | 100 | 100 | 100 | 100 | 100 | 100 | 100 | 95 | 85 | 100 |
| $\underset{i-C_3H_7-NH}{\overset{C_2H_5O}{>}}\overset{O}{\overset{\|}{P}}-S-CH_2-\overset{O}{\overset{\|}{C}}-NH-CH_3$ (2) | 100 | 100 | 100 | 100 | 100 | 100 | 100 | 100 | 100 | 85 | 100 |

EXAMPLE 5

Tetranychus Test (resistant)

Solvent: 3 parts by weight of acetone
Emulsifier: 1 part by weight of alkylaryl polyglycol ether To prepare an appropriate preparation of the active compound, 1 part by weight of the active compound was mixed with the indicated amount of solvent which contained the indicated amount of emulsifier, and the concentrate was diluted with water to the desired concentration.

Bean plants (*Phaseolus vulgaris*), which were about 10–30 cm high, were sprayed with the preparation of the active compound until dripping wet. These bean plants were heavily infested with the two-spotted spider mite (*Tetranychus urticae*) in all stages of development.

After the indicated times, the effectiveness of the preparation of the active compound was determined by counting the dead spider mites. The degree of destruction thus obtained is quoted in percent. 100 percent denotes that all of the spider mites were destroyed and 0 percent denotes that no spider mites were destroyed.

The active compounds, the concentrations of the active compounds, the evaulation times and the results can be seen from the following Table 5:

Table 5

(*Tetranychus* test / resistant)

| Active compound | | Active compound concentration in % by weight | Degree of destruction in % after 2 days |
|---|---|---|---|
| $$\underset{(CH_3O)_2}{\overset{S}{\overset{\|}{P}}}-S-CH_2-\overset{O}{\overset{\|}{C}}-NH-CH_3$$ (known) | (B) | 0.1<br>0.01 | 95<br>0 |
| $$\underset{i-C_3H_7-NH}{\overset{C_2H_5O}{\diagdown}}\overset{O}{\underset{\|}{P}}-S-CH_2-\overset{O}{\overset{\|}{C}}-NH-CH_3$$ | (2) | 0.1<br>0.01 | 99<br>75 |
| $$\underset{i-C_3H_7-NH}{\overset{C_2H_5O}{\diagdown}}\overset{O}{\underset{\|}{P}}-S-CH_2-\overset{O}{\overset{\|}{C}}-NH-i-C_3H_7$$ | (1) | 0.1<br>0.01 | 100<br>40 |

EXAMPLE 6

Critical concentration test

Test nematode: *Meloidogyne incognita*
Solvent: 3 parts by weight of acetone
Emulsifier: 1 part by weight of alkylaryl polyglycol ether To produce a suitable preparation of active compound, 1 part by weight of active compound was mixed with the stated amount of solvent, the stated amount of emulsifier was added and the concentrate was diluted with water to the desired concentration.

The preparation of active compound was intimately mixed with soil which was heavily infested with the test nematodes. The concentration of the active compound in the preparation was of practically no importance; only the amount of active compound per unit volume of soil, which is given in p.p.m., was decisive. The soil was filled into pots, lettuce was sown therein, and the pots were kept at a greenhouse temperature of 27°C. After 4 weeks, the lettuce roots were examined for infestation with nematodes, and the degree of effectiveness of the active compound was determined as a percentage. The degree of effectiveness was 100 percent when infestation was completely avoided; it was 0 percent when the infestation was exactly the same as in the case of the control plants in untreated soil which had been infested in the same manner.

The active compounds, the amounts applied and the results can be seen from the following Table 6:

The process of this invention is illustrated by the following preparative Example.

EXAMPLE 7

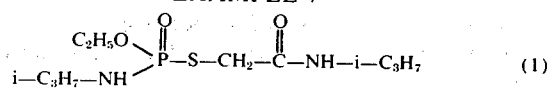

(1)

27.1 g (0.20 mole) of chloroacetic acid momoisopropylamide in 50 ml of acetonitrile were added dropwise, at room temperature, to a solution of 62.0 g (0.28 mole) of the sodium salt of O-ethyl-N-monoisopropylamido-monothiophosphoric acid in 300 ml of acetonitrile. The reaction took place slightly exothermically. The mixture was stirred further overnight at 40° to 60°C, and the inorganic salts which had separated out were then filtered off. The solvent was removed and the residue was taken up in dichloromethane; the solution was twice washed with a little water, the organic phase was dried over sodium sulfate and filtered, and the filtrate was concentrated. After trituration with petroleum ether, S-(monoisopropylamidocarbonyl)-methyl-O-ethyl-N-monoisopropyl-monothiophosphoric acid ester amide was obtained as almost colorless, water-soluble crystals of melting point 85° to 86°C. The yield was 37.0 g (65.5% of theory).

The following compounds were obtained by procedures analogous to that described above:

| Formula | | Melting point or refractive index |
|---|---|---|
| $$\underset{i-C_3H_7-NH}{\overset{C_2H_5O}{\diagdown}}\overset{O}{\underset{\|}{P}}-S-CH_2-\overset{O}{\overset{\|}{C}}-NH-CH_3$$ | (2) | melting point: 68 to 69°C |

Table 6

| Active compound | | (*Meloidogyne incognita* Test) Degree of Destruction in % at an active compound concentration of | | | | |
|---|---|---|---|---|---|---|
| | | 20 | 10 | 5 | 2.5 | ppm |
| $$\underset{CH_3O}{\overset{CH_3O}{\diagdown}}\overset{O}{\underset{\|}{P}}-S-CH_2-\overset{O}{\overset{\|}{C}}-NH-CH_3$$ (known) | (A) | 0 | | | | |
| $$(CH_3O)_2\overset{S}{\overset{\|}{P}}-S-CH_2-\overset{O}{\overset{\|}{C}}-NH-CH_3$$ (known) | (B) | 0 | | | | |
| $$\underset{i-C_3H_7-NH}{\overset{C_2H_5O}{\diagdown}}\overset{O}{\underset{\|}{P}}-S-CH_2-\overset{O}{\overset{\|}{C}}-NH-CH_3$$ | (2) | 100 | 98 | 90 | 50 | |
| $$\underset{i-C_3H_7-NH}{\overset{C_2H_5O}{\diagdown}}\overset{O}{\underset{\|}{P}}-S-CH_2-\overset{O}{\overset{\|}{C}}-NH-i-C_3H_7$$ (1) | | 95 | 90 | 50 | | |

13
Continued

| Formula | Melting point or refractive index |
|---|---|
| 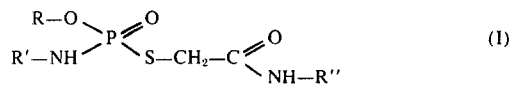 (3) | $n_D^{20}$: 1.4988 |
| C₂H₅O\P—S—CH₂—C—NH—CH₃ (4) CH₃—NH | $n_D^{20}$: 1.5140 |

It will be appreciated that the instant specification and examples are set forth by way of illustration and not limitation, and that various modifications and changes may be made without departing from the spirit and scope of the present invention.

What is claimed is:

1. An O-alkyl-N-mono-alkyl-S-(amidocarbonyl)-methylmonothiophosphoric acid ester amide of the formula $$\begin{array}{c} R-O \\ R'-NH \end{array} P \begin{array}{c} =O \\ S-CH_2-C \end{array} \begin{array}{c} O \\ NH-R'' \end{array} \quad (I)$$

in which

R, R' and R'' each independently is alkyl of 1 to 6 carbon atoms.

2. A compound according to claim 1, in which R, R' and R'' each is alkyl of 1 to 4 carbon atoms.

3. The compound according to claim 1 wherein such compound is O-ethyl-N-isopropyl-S-(isopropylamidocarbonyl)-methyl-monothiophosphoric acid ester amide of the formula

14

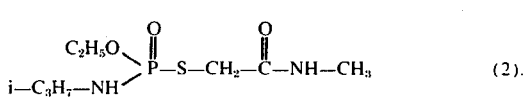 (1).

4. The compound according to claim 1 wherein such compound is O-ethyl-N-isopropyl-S-(methylamidocarbonyl)-methyl-monothiophosphoric acid ester amide of the formula

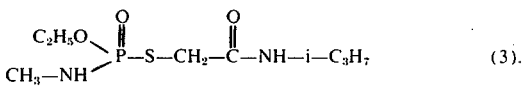 (2).

5. The compound according to claim 1 wherein such compound is O-ethyl-N-methyl-S-(isopropylamidocarbonyl)-methyl-monothiophosphoric acid ester amide of the formula C₂H₅O\P—S—CH₂—C—NH—i—C₃H₇ (3).
CH₃—NH 6. The compound according to claim 1 wherein such compound is O-ethyl-N-methyl-S-(methylamidocarbonyl)-methyl-monothiophosphoric acid ester amide of the formula

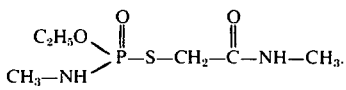

* * * * *